United States Patent
Chen et al.

(10) Patent No.: US 12,147,480 B2
(45) Date of Patent: *Nov. 19, 2024

(54) CONTENT KEYWORD IDENTIFICATION

(71) Applicant: Google LLC, Mountain View, CA (US)

(72) Inventors: Kai Chen, Santa Monica, CA (US); Steven G. Dropsho, Zürich (CH); Charles Johan Larsson Tibell, San Francisco, CA (US); Diego Federici, Zürich (CH)

(73) Assignee: GOOGLE INC., Mountain View, CA (US)

( * ) Notice: Subject to any disclaimer, the term of this patent is extended or adjusted under 35 U.S.C. 154(b) by 629 days.

This patent is subject to a terminal disclaimer.

(21) Appl. No.: 17/140,721

(22) Filed: Jan. 4, 2021

(65) Prior Publication Data

US 2021/0125222 A1   Apr. 29, 2021

Related U.S. Application Data

(63) Continuation of application No. 14/853,631, filed on Sep. 14, 2015, now Pat. No. 11,709,889, which is a
(Continued)

(51) Int. Cl.
*G06F 16/951*   (2019.01)
*G06F 16/738*   (2019.01)
(Continued)

(52) U.S. Cl.
CPC .......... *G06F 16/951* (2019.01); *G06F 16/738* (2019.01); *G06F 16/7867* (2019.01); *G06Q 30/0254* (2013.01); *G06Q 30/0277* (2013.01)

(58) Field of Classification Search
CPC .. G06F 16/951; G06F 16/738; G06F 16/7867; G06Q 30/0254
See application file for complete search history.

(56) References Cited

U.S. PATENT DOCUMENTS 6,714,975 B1   3/2004   Aggarwal et al.
7,877,387 B2   1/2011   Hangartner
(Continued)

OTHER PUBLICATIONS

Final Office Action for U.S. Appl. No. 13/422,584 dated Sep. 5, 2013 (10 pages).
(Continued)

*Primary Examiner* — Miranda Le
(74) *Attorney, Agent, or Firm* — MARSHALL, GERSTEIN & BORUN LLP

(57) ABSTRACT

In general, in one aspect, a method includes compiling user interaction statistics for a set of content items displayed in association with a first target media document having a non-textual portion, at least some of the content items associated with one or more keywords, based on the interaction statistics, associating the first target media document with at least some of the keywords associated with the content items, and based on a common attribute of the first target media document and a second target media document having a non-textual portion, associating the second target media document with at least some of the keywords assigned to the first target media document. Other aspects include corresponding systems, apparatus, and computer programs stored on computer storage devices.

16 Claims, 4 Drawing Sheets

Related U.S. Application Data continuation of application No. 13/422,584, filed on Mar. 16, 2012, now Pat. No. 9,146,993.

(51) Int. Cl.
*G06F 16/78* (2019.01)
*G06Q 30/0251* (2023.01)
*G06Q 30/0241* (2023.01)

(56) References Cited

U.S. PATENT DOCUMENTS

| | | | |
|---|---|---|---|
| 8,108,257 B2 | 1/2012 | Sengamedu | |
| 8,132,767 B2 | 3/2012 | Oh et al. | |
| 8,160,925 B2 | 4/2012 | Anand et al. | |
| 8,189,963 B2 | 5/2012 | Li et al. | |
| 8,190,594 B2 | 5/2012 | Park et al. | |
| 8,260,664 B2 * | 9/2012 | Vadlamani | G06Q 30/0251 707/738 |
| 8,266,162 B2 | 9/2012 | Cava | |
| 8,291,451 B2 | 10/2012 | Roberts et al. | |
| 8,301,649 B1 | 10/2012 | Hansen | |
| 8,307,392 B2 | 11/2012 | Ahanger et al. | |
| 8,311,997 B1 | 11/2012 | Kauchak et al. | |
| 8,335,719 B1 | 12/2012 | Quraishi et al. | |
| 8,359,612 B2 | 1/2013 | Barton | |
| 8,364,693 B2 | 1/2013 | Peters et al. | |
| 8,370,198 B2 | 2/2013 | Gupta et al. | |
| 8,375,312 B2 | 2/2013 | Marinkovich et al. | |
| 8,380,570 B2 | 2/2013 | Agarwal et al. | |
| 8,380,691 B1 | 2/2013 | Tunguz-Zawislak | |
| 8,401,903 B2 | 3/2013 | Lerman et al. | |
| 8,522,273 B2 | 8/2013 | Huber et al. | |
| 8,554,775 B2 | 10/2013 | Kon et al. | |
| 8,625,018 B2 | 1/2014 | Bilbrey et al. | |
| 8,700,599 B2 | 4/2014 | Udupa et al. | |
| 8,713,078 B2 | 4/2014 | Kunjithapatham et al. | |
| 8,762,364 B2 | 6/2014 | Parekh et al. | |
| 8,781,304 B2 | 7/2014 | Spears | |
| 8,914,301 B2 | 12/2014 | Book | |
| 9,043,860 B2 | 5/2015 | Lee et al. | |
| 9,087,331 B2 | 7/2015 | Ives et al. | |
| 9,195,996 B1 * | 11/2015 | Walsh | G06Q 30/0269 |
| 9,275,390 B1 * | 3/2016 | Barnes | G06Q 30/00 |
| 9,571,874 B2 * | 2/2017 | Bhatia | H04N 21/4788 |
| 9,633,356 B2 | 4/2017 | Howe et al. | |
| 9,811,835 B2 | 11/2017 | Vaidyanathan et al. | |
| 9,846,737 B2 | 12/2017 | Gross | |
| 10,021,059 B1 * | 7/2018 | Rao | H04L 63/0428 |
| 10,152,722 B2 * | 12/2018 | Heath | G06Q 30/02 |
| 2004/0039642 A1 | 2/2004 | Jacobs et al. | |
| 2004/0059708 A1 | 3/2004 | Dean et al. | |
| 2005/0047580 A1 | 3/2005 | Mow et al. | |
| 2006/0004628 A1 | 1/2006 | Axe et al. | |
| 2006/0167747 A1 | 7/2006 | Goodman et al. | |
| 2007/0027772 A1 | 2/2007 | Chou | |
| 2007/0078713 A1 | 4/2007 | Ott et al. | |
| 2007/0156887 A1 | 7/2007 | Wright et al. | |
| 2007/0179857 A1 | 8/2007 | Collins | |
| 2007/0214048 A1 * | 9/2007 | Chan | G06Q 30/0277 705/14.69 |
| 2007/0219859 A1 * | 9/2007 | Huntington | G06Q 30/0246 705/14.66 |
| 2007/0239530 A1 | 10/2007 | Datar et al. | |
| 2008/0004947 A1 | 1/2008 | Mathew et al. | |
| 2008/0255935 A1 | 10/2008 | Madhavan et al. | |
| 2008/0270228 A1 | 10/2008 | Dasdan | |
| 2008/0275770 A1 | 11/2008 | Kitts | |
| 2009/0018917 A1 | 1/2009 | Chapman et al. | |
| 2009/0037947 A1 | 2/2009 | Patil | |
| 2009/0048925 A1 | 2/2009 | Song et al. | |
| 2009/0055254 A1 | 2/2009 | Madhavan et al. | |
| 2009/0076882 A1 | 3/2009 | Mei et al. | |
| 2009/0083260 A1 | 3/2009 | Artom et al. | |
| 2009/0171787 A1 | 7/2009 | Mei et al. | |
| 2009/0210385 A1 | 8/2009 | Ramaswamy et al. | |
| 2009/0222519 A1 | 9/2009 | Boyd | |
| 2010/0094704 A1 | 4/2010 | Subramanian et al. | |
| 2010/0094860 A1 | 4/2010 | Lin et al. | |
| 2010/0106606 A1 | 4/2010 | Filice et al. | |
| 2010/0145803 A1 | 6/2010 | Kobani | |
| 2010/0161411 A1 * | 6/2010 | Wu | G06Q 30/0255 707/E17.089 |
| 2010/0257053 A1 * | 10/2010 | Ferber | G06Q 30/0254 705/14.45 |
| 2010/0287134 A1 | 11/2010 | Hauser | |
| 2010/0293057 A1 * | 11/2010 | Haveliwala | G06F 16/9535 705/14.66 |
| 2010/0306249 A1 | 12/2010 | Hill et al. | |
| 2010/0324991 A1 * | 12/2010 | Colledge | G06F 16/9535 707/769 |
| 2010/0333140 A1 | 12/2010 | Onodera et al. | |
| 2011/0029393 A1 | 2/2011 | Apprendi et al. | |
| 2011/0047163 A1 | 2/2011 | Chechik et al. | |
| 2011/0131272 A1 | 6/2011 | Littlejohn et al. | |
| 2011/0161318 A1 | 6/2011 | Lyon et al. | |
| 2011/0161348 A1 | 6/2011 | Oron | |
| 2011/0166929 A1 | 7/2011 | Lee et al. | |
| 2011/0170838 A1 | 7/2011 | Rosengart et al. | |
| 2011/0184807 A1 | 7/2011 | Wang et al. | |
| 2011/0282732 A1 | 11/2011 | Bax et al. | |
| 2011/0313852 A1 | 12/2011 | Kon et al. | |
| 2012/0041961 A1 | 2/2012 | Norton et al. | |
| 2012/0059708 A1 | 3/2012 | Galas et al. | |
| 2012/0072550 A1 | 3/2012 | Anufrieva | |
| 2012/0150657 A1 | 6/2012 | Rubinstein et al. | |
| 2012/0197995 A1 | 8/2012 | Caruso | |
| 2012/0239506 A1 | 9/2012 | Saunders et al. | |
| 2013/0073374 A1 * | 3/2013 | Heath | G06Q 30/02 705/14.39 |
| 2013/0205235 A1 | 8/2013 | Gabara | |
| 2013/0243392 A1 | 9/2013 | Vasudevan et al. | |
| 2014/0214560 A1 | 7/2014 | Gern et al. | |
| 2016/0261701 A1 | 9/2016 | Dhawan et al. | |

OTHER PUBLICATIONS

Final Office Action for U.S. Appl. No. 14/853,631 dated Jul. 20, 2018 (24 pages).
Final Office Action for U.S. Appl. No. 14/853,631 dated Oct. 8, 2019 (18 pages).
Final Office Action for U.S. Appl. No. 14/853,631 dated Sep. 17, 2020 (14 pages).
Non-Final Office Action for U.S. Appl. No. 13/422,584 dated Feb. 20, 2013 (10 pages).
Non-Final Office Action for U.S. Appl. No. 13/422,584 dated Sep. 18, 2014 (12 pages).
Non-Final Office Action for U.S. Appl. No. 14/853,631 dated Apr. 19, 2019 (17 pages).
Non-Final Office Action for U.S. Appl. No. 14/853,631 dated Apr. 2, 2020 (14 pages).
Non-Final Office Action for U.S. Appl. No. 14/853,631 dated Feb. 28, 2018 (21 pages).
Notice of Allowance for U.S. Appl. No. 13/422,584 dated Jun. 1, 2015 (18 pages).

* cited by examiner

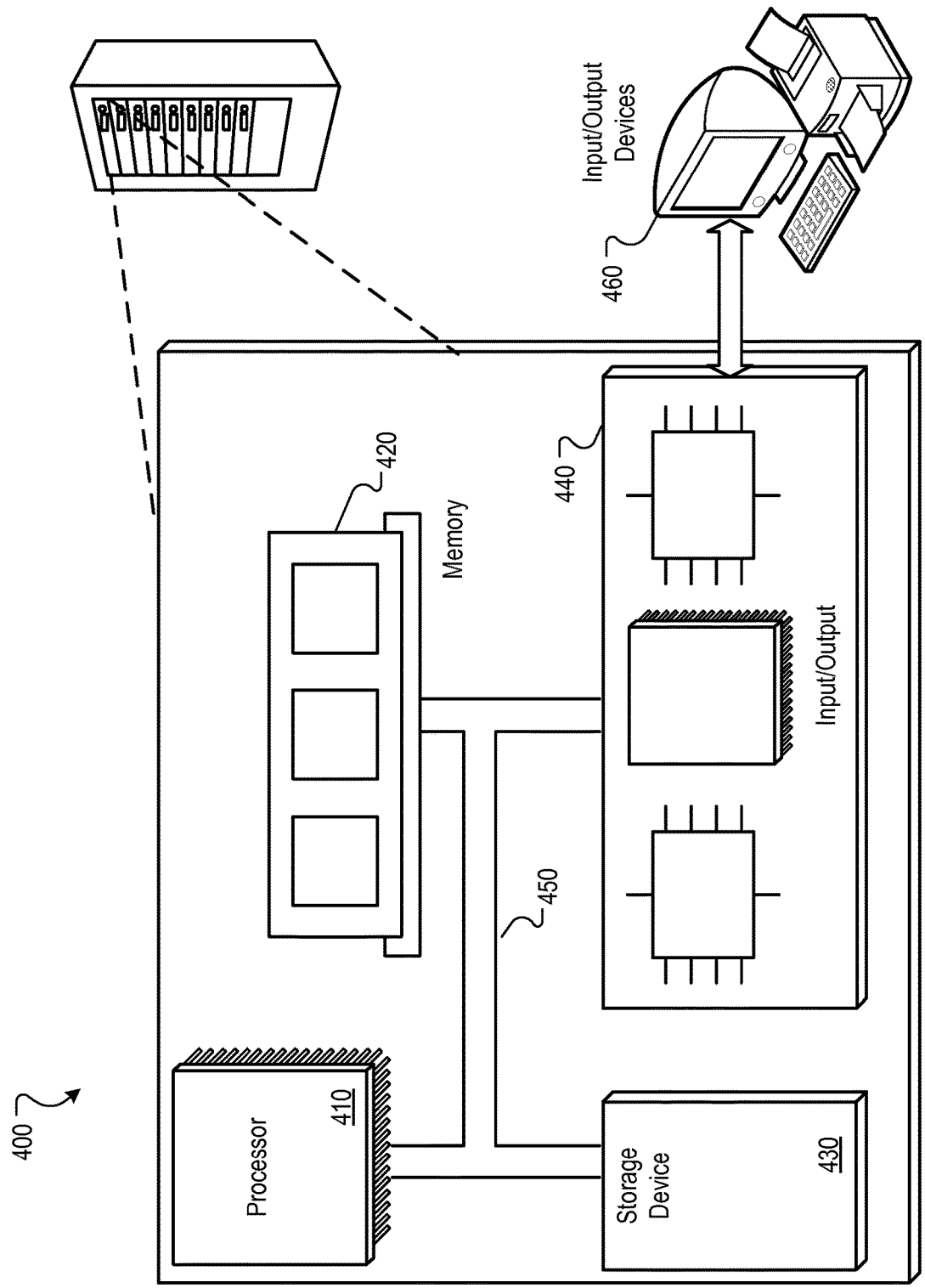

CONTENT KEYWORD IDENTIFICATION

CROSS-REFERENCE TO RELATED APPLICATIONS

The present application is continuation of and claims priority to U.S. patent application Ser. No. 14/853,631, entitled "CONTENT KEYWORD IDENTIFICATION," filed Sep. 14, 2015, which itself is a continuation of and claims priority to U.S. patent application Ser. No. 13/422,584, entitled "CONTENT KEYWORD IDENTIFICATION," filed Mar. 16, 2012, the contents of each of which are hereby incorporated by reference in their entirety.

BACKGROUND

This specification relates to information presentation and identification of keywords associated with content items.

Information can be transmitted over a network and displayed on a user device. Sometimes the information is textual, for example, a web page containing text. The text of the web page can be analyzed to determine information about the web page such as topics that relate to the web page. For example, a web page containing several instances of particular words could be described as relating to those words. Sometimes the transmitted information does not contain much text, for example, a web page containing non-textual media such as audio and video and may include little or any associated text. In these examples, other cues could be used to determine topics related to the information.

SUMMARY

In general, in one aspect, a method includes compiling user interaction statistics for a set of content items displayed in association with a first target media document having a non-textual portion, at least some of the content items associated with one or more keywords, based on the interaction statistics, associating the first target media document with at least some of the keywords associated with the content items, and based on a common attribute of the first target media document and a second target media document having a non-textual portion, associating the second target media document with at least some of the keywords assigned to the first target media document. Other embodiments of this aspect include corresponding systems, apparatus, and computer programs stored on computer storage devices.

These and other embodiments can each optionally include one or more of the following features. The aspect includes selecting a content item to display in association with at least one of the first target media document and the second target media document based on the keywords assigned to the respective target media document. The user interaction statistics include at least one of a click-through rate of the content item when the content item is displayed in association with the first target media document and a conversion rate of the content item when the content item is displayed in association with the first target media document. The common attribute includes at least one of a source of the target media documents, a content channel of the target media documents, and a single search query associated in a search system with the target media documents. The common attribute includes a media document topic common to the target media documents. The media document topic is identified based on non-textual content of the first target media document and non-textual content of the second target media document. The media document topic is received from a database associating media document topics with media documents. The media document topic includes at least one of a location at which the target media documents were created and an entity portrayed in the target media documents.

Particular embodiments of the subject matter described in this specification can be implemented so as to realize none, one or more of the following advantages. Keywords can be associated with non-textual content. Multiple items of non-textual content can be related to each other according to keywords.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 4 is block diagram of an example computer system.

Like reference numbers and designations in the various drawings indicate like elements.

DETAILED DESCRIPTION

Content items (e.g., advertisements or "ads") can be chosen for display alongside online content based in part on keywords that have been associated with the content items and are also related to the online content. For example, a content delivery service can select content to display alongside the web page by identifying keywords that appear in the text of the web page. This technique is less effective for online content that is primarily non-textual, for example, online content that includes audio and/or video. To improve the effectiveness of the selection of content for delivery along with non-textual online content, the content management service can compile statistics about the way in which users interact with various content items displayed with the non-textual online content. For example, content items that have a high click-through rate or a high conversion rate can be analyzed to determine which keywords those content items have in common, indicating that the keywords are likely to be good matches for the non-textual online content. Those keywords can then be associated with the non-textual online content so that other content items associated with the keywords can be displayed alongside the non-textual content. Further, multiple items of online content having attributes in common can be associated with the same keywords based on this technique.

Figure 1:
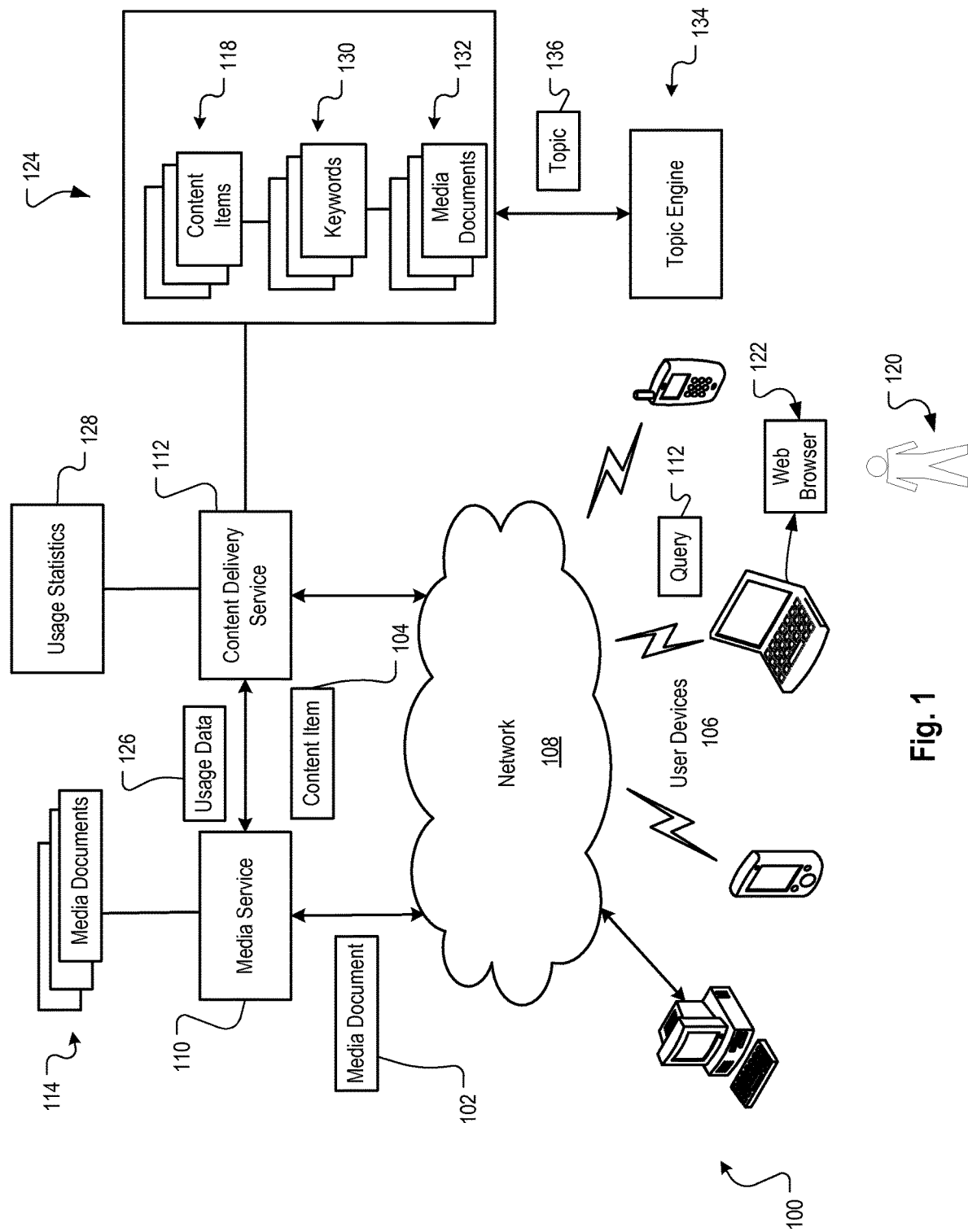
FIG. 1 is a block diagram of an online environment for presenting and analyzing information.

FIG. 1 is a block diagram of an online environment 100 for presenting and analyzing information. The online environment 100 facilitates the delivery of media documents 102 to user devices 106 using a network 108. For example, a user device 106 can display media documents 102 using software such as a web browser 122. The media documents 102 may include non-textual content, for example, video, images, audio, or other non-textual content.

Media documents 102 can be provided by an online resource such as a media service 110. A media service 110 includes functionality for using the network 108 to facilitate the transfer of data. For example, the media service 110 can include a web server that makes media documents 102 available on the network 108. The media documents 102 can be prepared by the media service 110 from stored media documents 114 available to the media service 110 (e.g., residing in data storage available to the media service 110). In some examples, the media documents 102 can be provided by the media service 110 in the form of a web page suitable for display on the web browser 122 of a user device 106. The media documents 102 may be viewed on the web browser 122 by a user 120 of the user device 106.

Content items 104 can be provided by another online resource such as a content delivery service 112. In some implementations, the content items 104 are advertisements. A content delivery service 112 includes functionality for using the network 108 to facilitate the transfer of data. For example, the content delivery service 112 can include a web server that provides content items 104 using the network 108. The content items 104 can be prepared or identified by the content delivery service 112 from stored content items 118 available to the content delivery service 112 (e.g., residing in data storage available to the content delivery service 112). In some examples, the content items 104 can be provided by the content delivery service 112 in a form suitable for display on the web browser 122 of a user device 106. The content items 104 may be viewed on the web browser 122 by a user 120 of the user device 106.

A content item 104 can be provided in association with a media document 102. In some examples, one or more content items 104 can be associated with a media document 102, and some or all of the associated content items 104 can be provided for display by the content delivery service 112 when the media document 102 is provided for display by the media service 110. For example, if the media document 102 is a video file provided to a user device 106 for display on a web browser 122, then one or more of the content items 104 can be provided to the user device 106 for display in the web browser 122 either coincident with, before, or after the video file is displayed to a user 120. The content items 104 could be advertisements that relate to the video file, for example. In some examples, the content items 104 could be provided by the content delivery service 112 to the media service 110, and the media service 110 provides the content items 104 to a user device 106 at the same time as the media service 110 provides the media document 102 to the user device 106. In some examples, the content delivery service 112 provides the content items 104 to a user device 106 (for example, at the same time as the media service 110 provides the media document 102).

In some examples, media documents 102 are provided to user devices 106 in response to a direct request for a particular media document 102. For example, a user 120 of the user device 106 may click on a hyperlink directed to the media document 102, and the media service 110 provides the media document 102 in response. In some examples, media documents 102 are provided to user devices 106 in response to other actions. For example, the media service 110 may include search functionality. The user 120 of the user device 106 may submit a search query 125 to the media service 110, and in turn the media service can provide the media document 102 (or a hyperlink to the media document 102) in response to the search query 125.

The content delivery service 112 can receive usage data 126 from the media service 110. In some examples, the usage data 126 indicates information about the way in which users (e.g., the user 120) have interacted with content items 104 provided for display in association with media documents 102 displayed on user devices 106. In some examples, the usage data 126 can indicate how many times the content items 104 have been displayed and which media documents 102 they have been displayed with or alongside. In some examples, if the content items 104 include clickable hyperlinks (e.g., hyperlinks that can be clicked or otherwise selected on a user interface), the usage data 126 can indicate how many times the content items 104 have been clicked/selected. In some examples, the usage data 126 includes information about search queries (e.g., the search query 125) submitted by user devices 106 to which one or more of the media documents 102 provided to user devices 106 were responsive.

In some examples, the content delivery service 112 can determine some usage data 126 independently of other entities such as the media service 110. In some examples, the content delivery service 112 can receive some or all of the usage data 126 directly from user device 106. In some examples, usage data 126 can be received from other entities. For example, if a content item 104 is an advertisement provided on behalf of a third party advertiser, the content item 104 may include a link (e.g., a hyperlink displayed on a user device 106) to a resource of the third party advertiser such as a web site of the third party advertiser. The web site of the third party advertiser may provide usage data 126 to the content delivery service 112. For example, the web site may provide information about conversions achieved by the advertisement. In some examples, usage data 126 is provided to the media service 110 by a third party entity, and the usage data 126 is in turn provided to the content delivery service 112.

The content delivery service 112 can use usage data 126 received from one or more sources to compile usage statistics 128 summarizing the usage data 126. For example, the usage statistics 128 can include how frequently a content item 104 is interacted with (e.g., clicked) relative to how often it is displayed, e.g., a click-through rate. The usage statistics 128 can include how frequently a content item 104 achieves a conversion, e.g., if the content item is an advertisement. The usage statistics 128 can include which media documents 102 a content item 104 is displayed with. The usage statistics 128 can include sources of media documents 102 displayed with content items 104, e.g., who created the media document 102 or who uploaded a media document 102 to the media service 110. The usage statistics 128 can include content channels of media documents 102 associated with a content item 104, e.g., if the media documents 102 are videos and organized by the media service 110 as video channels. The usage statistics 128 can include search queries (e.g., the search query 125) used to access media documents 102 displayed with content items 104.

In some implementations, the content delivery service 112 is operated by the same entity as the media service 110. For example, the content delivery service 112 can be operated by a company or organization that also operates the media service 110. In some implementations, one entity operates the content delivery service 112 and another different entity operates the media service 110.

The content delivery service 112 stores association data 124 that specifies relationships between types of data. One type of association specified by the association data 124 is relationships between stored content items 118 and keywords 130. The keywords 130 are individual words or groups of words that indicate topics that are associated with or related to (e.g., semantically) the content items 118. Words or phrases can be semantically related to a content item if they describe a topic of the content item or otherwise relate to content of the content item. For example, a content item 118 that is an advertisement for a tropical travel destination may be semantically related to keywords such as "vacation," "beachfront hotel," "ocean," and other keywords that may describe the tropical travel destination. The association data 124 specifies which content items 118 are related to which keywords 130. In some implementations, a keyword 130 is determined to be related to a content item 118 if the keyword 130 appears in textual content of the content item 118, or if a synonym for the keyword 130 (or a portion of the keyword 13) appears in textual content of the content item 118.

In some examples, the association data 124 specifying relationships between the content items 118 and keywords 130 is data that defines an explicit association between individual content items and individual keywords. For example, the association data 124 can include a database of keywords 130 which are linked to particular content items 118. In some examples, the association data 124 specifying relationships between the content items 118 and keywords 130 is data that can be used to compute keywords that are associated with content items and content items that are associated with content items. For example, the association data 124 may specify an algorithm that can accept selected content items 118 as input and identify keywords 130 as output (e.g., based on textual or non-textual content of the content items 118).

Generally, the association between content items 118 and keywords 130 can be used by the content delivery service 112 to choose a content item 118 for display. For example, if a content item 118 is an advertisement, then the advertisement may be chosen for display in a slot on a web page. Keywords relevant to the web page can be identified and advertisements associated with the keywords can be chosen for display. One way to identify keywords relevant to a web page is to identify words that appear in the web page (for example, words which appear frequently in the web page, or proper names that appear in the web page), and use those words as keywords. If the content delivery service 112 is choosing content items 118 for display alongside non-textual content, then the non-textual content (e.g., media documents containing little or no text) may be associated with keywords 130 in other ways.

In some examples, the association data also specifies associations between keywords 130 and media documents 114. In some examples, the association data 124 includes an association of media document references 132 with the keywords 130. In some implementations, the media document references 132 each describe one of the media documents 114 stored by the media service 110. For example, the media document references 132 could be uniform resource locators specifying a location of media documents 114 available on the network 108, or the media document references 132 could be document names used by the media service 110 to identify individual media documents 114, or the media document references 132 could be another kind of reference to the media documents 114.

The media document references 132 are associated with keywords 130 that are related to the underlying media documents 114. For example, a media document reference 132 could reference a video file, and the keywords 130 associated with the media document reference 132 by the association data 124 could describe the content of the video file. If the video file is a video of a vacationer's day at the beach, then keywords 130 that might describe the content of the video file could be "vacation," "beach," "ocean," and other words or phrases that may relate to places, events, and other topics depicted in the video file.

If the media document references 132 identify media documents 114 which contain little or no text (for example, if the media documents 114 are videos), usage statistics 128 can be used to determine keywords 130 that are semantically related to the media document references 132 (and thus the underlying media documents 114).

Figure 2:
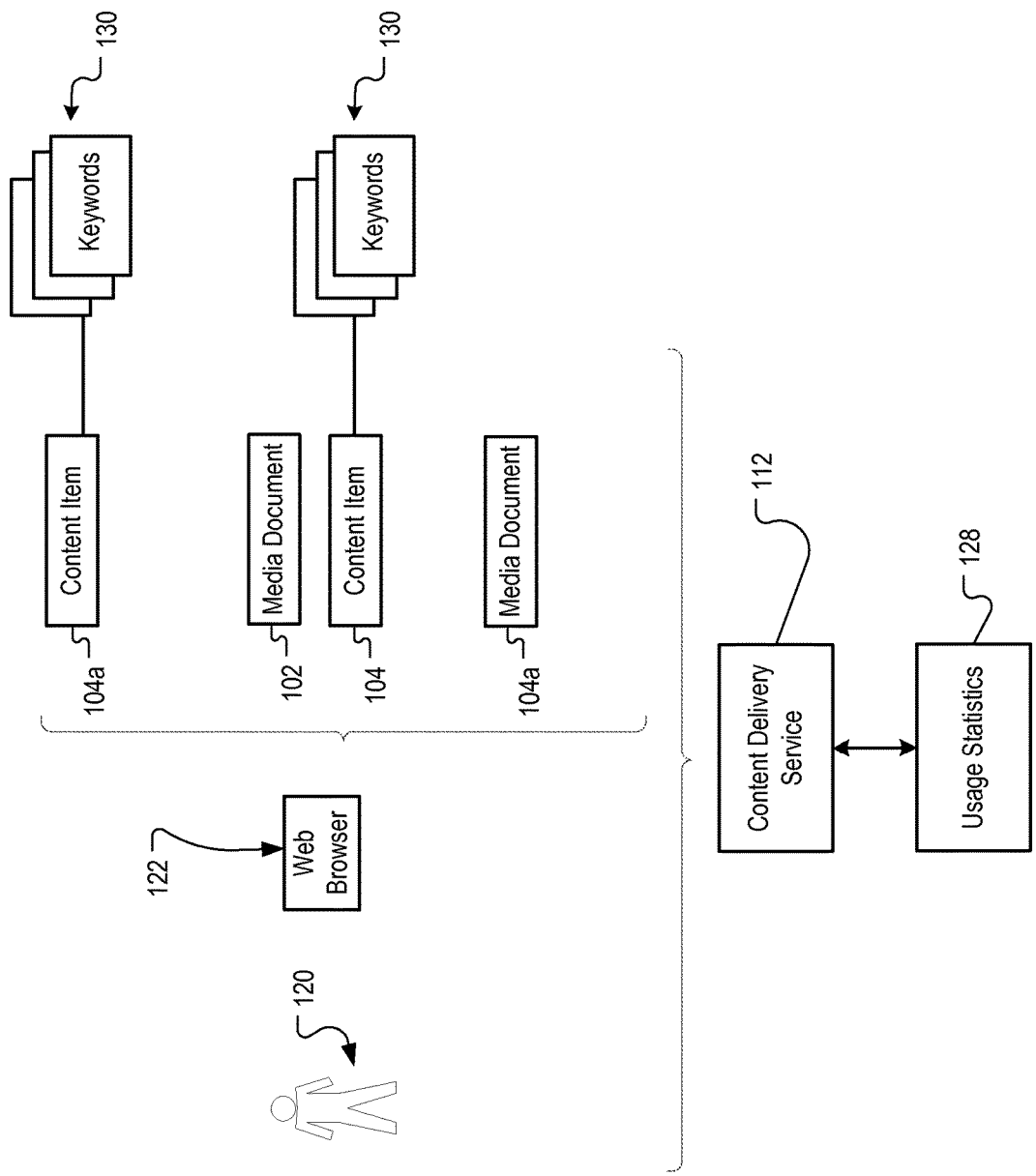
FIG. 2 shows a content delivery service determining keywords to associate with a media document based on usage statistics.

FIG. 2 shows the content delivery service 112 that can be used to determine keywords 130 to associate with a media document 102 based on usage statistics 128. In some examples, a content item 104 is displayed alongside a media document 102 in a web browser 122 to one or more users 120 on many occasions over time. These occasions are reflected in the usage statistics 128. For example, the content item 104 can be an advertisement and the media document 102 can be a video file. The content item 104 is associated with one or more keywords 130. If the content item 104 is interacted with frequently when displayed with the media document 102 (e.g., the advertisement has a high click-through rate), then the keywords 130 associated with the content item 104 may be relevant to the media document 102, because the user 120 viewing the media document 102 appears to be interested in the content item 104 as well. Thus, the content delivery service 112 can infer that the keywords 130 may be relevant to the media document 102. The keywords 130 may be more likely to be relevant to the media document 102 if other content items 104a sharing some or all of the keywords 130 are displayed with the same media document 102 and also have high click-through rates. The content delivery service 112 can use this information to associate keywords 130 with media documents 102. In addition to click-through rate, the content delivery service 112 can also determine that keywords 130 of a content item 104 may be relevant to a media document 102 if the content item 104 has a high conversion rate when displayed with the media document 102.

The content delivery service 112 can use an inference made about one media document 102 to infer similar information about a related media document 102a. In some examples, if the media documents 102, 102a were created or uploaded by a particular entity, such as a particular one of the users 120, then the media documents 102, 102a may be related in content. The content delivery service 112 can identify keywords inferred as relevant to one media document 102 and associate the keywords with another (e.g., the other) media document 102a. For example, a user who uploads a video related to his summer vacation on the beach may upload another video from the same vacation. Thus, keywords associated with one video, such as "vacation" and "beach," are may be relevant to the other video. In some examples, if the media documents 102, 102a belong to the same content channel (e.g., as designated by the media service 110 shown in FIG. 1), then the media documents 102, 102a may be related in content. For example, if one media document 102 belongs to a content channel for vacation videos, then keywords describing the media document 102 may be relevant to other media documents in the vacation videos channel. In some examples, if the media documents 102, 102a were retrieved by the same search query (e.g., the search query 125 shown in FIG. 1), then the media documents 102, 102a may be related in content. For example, if a user 120 submitted a search query of "vacation videos" and was provided the first media document 102 in response, and then the user 120 submitted the same search query of "vacation videos" and was provided the second media document 102a in response, then the media documents 102, 102a may be related in content. Any common attribute of media documents 102, 102a could be used to identify keywords associated with one media documents 102 and infer that the keywords should be associated with the second media document 102a.

In some examples, deducing that keywords are relevant to a media document includes associating a score with the keywords. In some examples, referring to FIG. 1, for each keyword 130 associated with a media document reference 132, the association can be assigned or characterized by a score. For example, if the content delivery service 112 has determined that a keyword 130 is very likely (e.g., above a likeliness threshold) to be related to a media document referenced by a media document reference 132, then the content delivery service 112 may give a high score to the association between the keyword 130 and the media document reference 132. If the content delivery service 112 has determined that a keyword 130 is marginally likely (e.g., below one likeliness threshold and above a lower likeliness threshold) to be related to a media document referenced by a media document reference 132, then the content delivery service 112 may give a low score to the association between the keyword 130 and the media document reference 132. The score can be used, for example, to set a cost for displaying a content item 118 with the underlying media document 114. For example, a content item 118 chosen for display with a media document 114 based on a high-scoring association between the media document reference 132 and the keyword 130 used to choose the content item 118 can be charged a high price, and a content item 118 chosen for display with a media document 114 based on a low-scoring association between the media document reference 132 and the keyword 130 can be charged a low price.

Referring to FIG. 1, in some implementations, the content delivery service 112 can consult a media document topic engine 134 to identify a media document topic of a media document 114 referenced by a media document reference 132. In some examples, a media document topic engine 134 is a database or other facility that processes media documents (e.g., media document 114) and identifies topics (e.g., topics 136) associated with the media document. For example, if the media document 114 is a video of a race car driving along a waterfront road, then the media document topic engine 134 may process the media document 114 and return topics 136 such as "automotive" and "beach." The media document topic engine 134 may determine topics 136 from attributes of the media document 114. For example, the media document topic engine 134 may identify subjects depicted in the media document 114 by analyzing the data of the media document 114. In the example where the media document 114 is a video depicting a race car driving along a waterfront road, the media document topic engine 134 may use computer vision techniques to identify an automobile in the video data and return a topic 136 of "automotive." Further, the media document topic engine 134 may examine metadata associated with the video identifying a geographic location at which the video was recorded to determine that the geographic location is along a waterfront and return a topic 136 of "beach." In some examples, the media document topic engine 134 may be a component of the media service 110 (e.g., operated by the media service 110), a component of the content delivery service 112, or the media document topic engine 134 may be operated by another entity in communication with the content delivery service 112.

In some examples, the content delivery service 112 can use topics 136 returned by the media document topic engine 134 to identify media documents 114 that are related. For example, one media document (e.g., the media document 102 shown in FIG. 2) that is related to a topic may be related to another media document (e.g., the media document 102a shown in FIG. 2). The content delivery service 112 can infer that keywords 130 associated with the first media document 102 can also be associated with the second media document 102a because the media documents 102, 102a share a topic.

In some examples, the content delivery service 112 can use topics 136 returned by the media document topic engine 134 to identify keywords associated with the media document 114. In some examples, the content delivery service 112 may categorize keywords 130 under topics. For example, keywords such as "race car," "driving," and "car dealerships" may be categorized under the topic of "automotive." The content delivery service 112 can identify keywords 130 associated with a topic 136 and associate those identified keywords 130 with a media document 114 identified as associated with the topic 136 by the topic engine 134.

Figure 3:
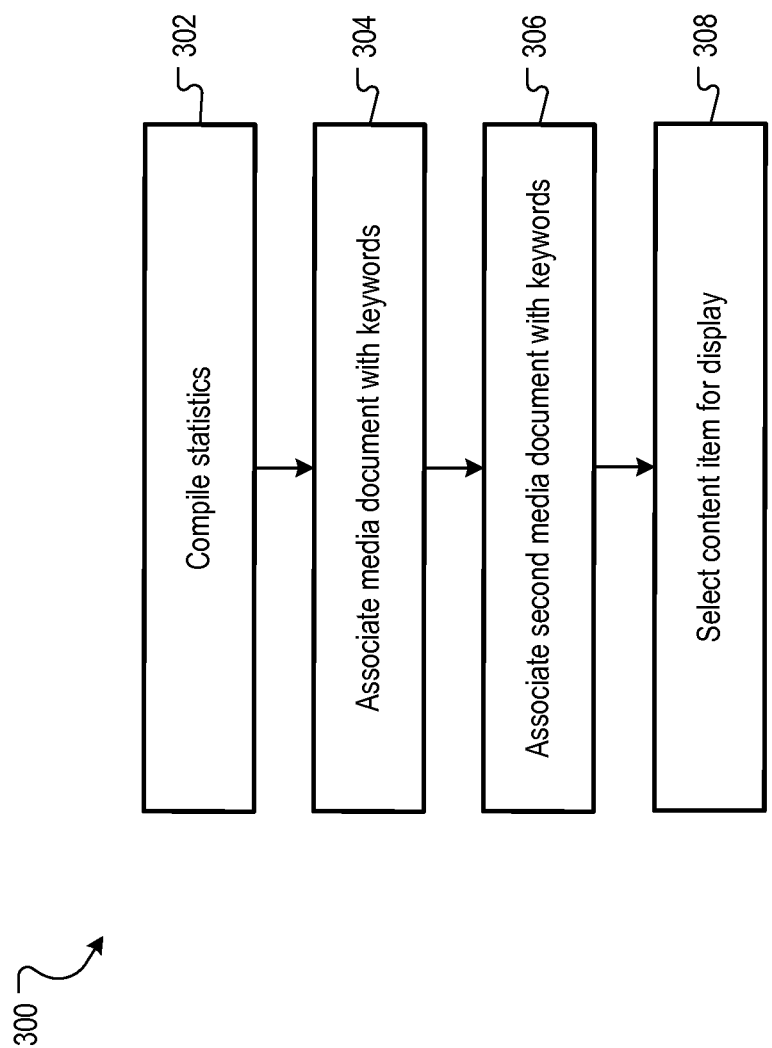
FIG. 3 shows a flowchart of an example process for associating keywords with media documents.

FIG. 3 shows a flowchart of an example process 300 for associating keywords with media documents. The process 300 can be performed, for example, by the content delivery service 112 shown in FIG. 1, or could be performed by other systems or apparatus.

User interaction statistics are compiled (302) based on usage data received from one or more sources. For example, the content delivery service could compile the user interaction statistics. In some examples, the usage data indicates information about content items being displayed in association with media documents. The media documents can each have a non-textual portion, and the content items can be associated with keywords. In some examples, the user interaction statistics include information such as a click-through rate of content items when the content items are displayed in association with media documents, or information such as a conversion of content items when the content items are displayed in association with media documents.

A target media document is associated (304) with keywords. For example, the content delivery service could associate the target media document with keywords. In some examples, the keywords can be associated with a content item, and the keywords of the content item can be determined to be relevant to the target media document based on the user interaction statistics. For example, keywords relevant to the target media document can be inferred from the user interaction statistics.

A second target media document is associated (306) with keywords. For example, the content delivery service could associate the second target media document with keywords. In some examples, the keywords can be associated with the second target media document based on a common attribute of the first target media document and a second target media document. For example, the common attribute could be a source of the target media documents, or a content channel of the target media documents, or a single search query associated in a search system with the target media documents, or a media document topic of the target media documents. In some implementations, the media document topic can be identified based on non-textual content of the first target media document and non-textual content of the second target media document. The media document topic could be a location at which the target media documents were created or an entity portrayed in the target media documents. Also, the media document topic could be received from a database associating media document topics with media documents.

A content item is selected (308) for display. For example, the content delivery service could select the content item for display. In some examples, the content item is selected for display in association with a first target media document or a second target media document based on keywords assigned to the respective target media document. For example, if one of the target media documents is associated with a particular keyword, then a content item also associated with that keyword can be selected for display with the target media document.

FIG. 4 is block diagram of an example computer system 400 that can be used to facilitate information presentation and identification of keywords associated with content items. The system 400 includes a processor 410, a memory 420, a storage device 430, and an input/output device 440. Each of the components 410, 420, 430, and 440 can be interconnected, for example, using a system bus 450. The processor 410 is capable of processing instructions for execution within the system 400. In one implementation, the processor 410 is a single-threaded processor. In another implementation, the processor 410 is a multi-threaded processor. The processor 410 is capable of processing instructions stored in the memory 420 or on the storage device 430.

The memory 420 stores information within the system 400. In one implementation, the memory 420 is a computer-readable medium. In one implementation, the memory 420 is a volatile memory unit. In another implementation, the memory 420 is a non-volatile memory unit.

The storage device 430 is capable of providing mass storage for the system 400. In one implementation, the storage device 430 is a computer-readable medium. In various different implementations, the storage device 430 can include, for example, a hard disk device, an optical disk device, or some other large capacity storage device.

The input/output device 440 provides input/output operations for the system 400. In one implementation, the input/output device 440 can include one or more of a network interface devices, e.g., an Ethernet card, a serial communication device, e.g., an RS-232 port, and/or a wireless interface device, e.g., and 802.11 card. In another implementation, the input/output device can include driver devices configured to receive input data and send output data to other input/output devices, e.g., keyboard, printer and display devices 460. Other implementations, however, can also be used, such as mobile computing devices, mobile communication devices, set-top box television client devices, etc.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. For example, although examples of non-textual content are used, the techniques described could be used to associate keywords with textual content, for example, a word or a sequence of words. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method, comprising:
   receiving, by one or more processors coupled to memory, from a plurality of client devices, interaction data identifying interactions with a plurality of second content items;
   determining, by the one or more processors, from the interaction data, respective interaction statistics for each second content item of the plurality of second content items, the respective interaction statistics corresponding to a number of interactions with each second content item while each second content item was previously presented with a first content item on a first media document;
   identifying, by the one or more processors, based on the respective interaction statistics of each respective second content item indicating interaction with the respective second content item while previously presented with the first content item, a first subset of the plurality of second content items, the respective interaction statistics of each second content item of the first subset exceeding an interaction statistics threshold indicating relevance of the respective second content item to the first content item;
   storing, by the one or more processors, based on identifying the first subset of the plurality of second content items, an association in a data structure between a respective content identifier of each second content item of the first subset and the first content item; and selecting, by the one or more processors, an additional content item of the first subset to display with the first content item on a second media document, the additional content item including data selected based on (i) the association between the respective content identifier of each second content item and the first content item, (ii) the respective interaction statistics of the additional content item, wherein the additional content item comprises an actionable object that, when selected at a client device, causes the client device to navigate to a web page resource identified by the actionable object, and (iii) an association of one or more keywords with the second media document.

2. The method of claim 1, further comprising identifying, by the one or more processors, the first content item and the plurality of second content items presented for display based on one or more search queries.

3. The method of claim 1, further comprising storing, by the one or processors, based on the respective interaction statistics, an association between one or more content identifiers of the plurality of second content items and the first content item.

4. The method of claim 1, wherein identifying the first subset further comprises determining, by the one or more processors, a predetermined number of second content items of the plurality of second content items having a higher interaction rate than other content items of the plurality of second content items.

5. The method of claim 1, further comprising:
identifying, by the one or more processors, one or more common attributes between the first content item and each second content item of the plurality of second content items, the one or more common attributes comprising at least one of a common source, a common content channel, a common search query, and a common topic; and
selecting, by the one or more processors, the additional content item further based on the one or more common attributes.

6. The method of claim 1, further comprising identifying, by the one or more processors, a media document topic of the second media document based on the respective content identifiers associated with the first content item.

7. The method of claim 1, wherein identifying the first subset further comprises:
determining, by the one or more processors, a respective number of keywords associated with each second content item of the plurality of second content items that are also associated with the first content item; and
identifying, by the one or more processors, the first subset of the plurality of second content items further based on the respective number of keywords associated with each second content item of the plurality of second content items that are also associated with the first content item.

8. The method of claim 1, wherein determining the respective interaction statistics for each second content item of the plurality of second content items further comprises determining, by the one or more processors, an interaction frequency for each second content item of the plurality of second content items relative to a presentation frequency of each second content item of the plurality of second content items.

9. A system, comprising:
one or more processors coupled to memory, the one or more processors configured to:
receive, from a plurality of client devices, interaction data identifying interactions with a plurality of second content items;
determine, from the interaction data, respective interaction statistics for each second content item of the plurality of second content items, the respective interaction statistics corresponding to a number of interactions with each second content item while each second content item was previously presented with a first content item on a first media document;
identify, based on the respective interaction statistics, a first subset of the plurality of second content items of each respective second content item indicating interaction with the respective second content item while previously presented with the first content item, the respective interaction statistics of each second content item of the first subset exceeding an interaction statistics threshold indicating relevance of the respective second content item to the first content item;
store, based on identifying the first subset of the plurality of second content items, an association in a data structure between a respective content identifier of each second content item of the first subset and the first content item; and
select an additional content item of the first subset to display with the first content item on a second media document, the additional content item including data selected based on (i) the association between the respective content identifier of each second content item and the first content item, (ii) the respective interaction statistics of the additional content item, wherein the additional content item comprises an actionable object that, when selected at a client device, causes the client device to navigate to a web page resource identified by the actionable object, and (iii) an association of one or more keywords with the second media document.

10. The system of claim 9, wherein the one or more processors are further configured to identify the first content item and the plurality of second content items based on one or more search queries.

11. The system of claim 9, wherein the one or more processors are further configured to store, based on the respective interaction statistics, an association between one or more content identifiers of the plurality of second content items and the first content item.

12. The system of claim 9, the one or more processors are further configured to determine a predetermined number of second content items of the plurality of second content items having a higher interaction rate than other content items of the plurality of second content items.

13. The system of claim 9, wherein the one or more processors are further configured to:
identify one or more common attributes between the first content item and each second content item of the plurality of second content items, the one or more common attributes comprising at least one of a common source, a common content channel, a common search query, and a common topic; and
select the additional content item further based on the one or more common attributes.

14. The system of claim 9, wherein the one or more processors are further configured to identify a media document topic of the second media document based on the respective content identifiers associated with the first content item.

15. The system of claim 9, wherein the one or more processors are further configured to:
- determine a respective number of keywords associated with each second content item of the plurality of second content items that are also associated with the first content item; and
- identify the first subset of the plurality of second content items further based on the respective number of keywords associated with each second content item of the plurality of second content items that are also associated with the first content item.

16. The system of claim 9, wherein the one or more processors are further configured to determine an interaction frequency for each second content item of the plurality of second content items relative to a presentation frequency of each second content item of the plurality of second content items.

* * * * *